Patented May 3, 1927.

1,627,389

UNITED STATES PATENT OFFICE.

OSCAR F. HEDENBURG AND DAVID S. PRATT, OF PITTSBURGH, PENNSYLVANIA, ASSIGNORS TO THE TOLEDO REX SPRAY COMPANY, OF TOLEDO, OHIO, A CORPORATION OF OHIO.

INSECTICIDE COMPOSITION.

No Drawing.   Application filed July 1, 1919.   Serial No. 307,985.

This invention relates to improved insecticide compositions containing lead arsenate and a deflocculating agent or agents, said compositions being readily suspendable in water and having improved spreading, covering and adhesive qualities and forming an adherent dry film resistant to the erosive action of water.

Lead arsenate insecticides have heretofore been made which were suspendable in water, but such insecticides have all, so far as we are aware, been deficient in spreading, covering and adhesive qualities. As a result of these defects, the particles of the lead arsenate tend to aggregate together and to become localized in groups upon surfaces to which the insecticide is applied, so that parts of the surfaces will have an excess of lead arsenate while other parts will be substantially free from it. Moreover, according to our observation, where the particles thus tend to aggregate together and to thus become localized, the insecticide does not adhere well to the surfaces and can be readily washed away, as by the action of rain.

The improved insecticide compositions of the present invention are substantially free from the defects above mentioned. They can be readily suspended and maintained in suspension in water, and they have improved spreading and covering properties, so that they can be readily spread out over the surfaces with substantial uniformity. The compositions, moreover, have improved adhesive qualities so that, when applied to the surfaces, the particles are relatively difficult to remove, and are resistant to removal by washing, as by the action of rain.

According to the present invention, lead arsenate, which may be produced by any suitable method of production, is compounded with a small amount of a deflocculating agent, such as gum arabic, which has the property of forming thick, viscous solutions which characterize hydrophilic or emulsoid colloids of which gum arabic is an example. The lead arsenate may be either the normal lead arsenate (containing about 25% $As_2O_5$), or it may be the acid lead arsenate (containing about 32% to 33% $As_2O_5$); and may be produced in any suitable manner which will give particles or crystals of the lead arsenate of a suitable degree of fineness or subdivision and capable of deflocculation. The lead arsenate may thus be produced by double decomposition, for example, by the reaction of a solution of lead nitrate with arsenic acid or with a solution of a soluble arsenate; or by the action of arsenic acid upon an aqueous suspension of lead oxide containing a small amount of acid, such as nitric or acetic acid.

The lead arsenate is, however, preferably and advantageously produced by the gradual and regulated addition of a solution of arsenic acid or arsenic oxide to a suspension of fumed lead oxide in water heated to about 70° to 100° C., and continually stirred during the reaction, as more fully set forth in our Patent No. 1,344,035, granted June 22, 1920. The lead oxide which we have found particularly well adapted for use is the yellow fumed or sublimed lead oxide or litharge, but other suitable finely divided forms of lead oxide may be similarly employed, for example, air floated lead oxide. Either the normal lead arsenate or the acid lead arsenate can be produced, depending upon the amount of arsenic acid added, as will be readily understood. This method of production of lead arsenate has, among others, the advantages of economy of manufacture, substantial freedom from electrolytes in the product, and slightly larger yields as compared with processes in which an acid, which will act as a solvent of the lead arsenate, is employed.

In the production of the novel insecticide compositions of the present invention, the lead arsenate, which may be either the normal arsenate or the acid arsenate, or a mixture of both in any desired proportions, may be compounded with different deflocculating agents.

In preparation the lead arsenate may be filtered from the accompanying liquor in the filter press, the filter cake dried, and ground, for example, in a Schutz O'Neill mill and then thoroughly mixed with about 1% of powdered gum arabic. The insecticide is thus obtained in powder form and is available for use or for storage or shipment. It may thus be placed in suspension in water and applied as a spray in the customary manner. Similarly, the new insecticide composition is valuable for use as a dusting powder because of its superior adhesive and spreading qualities, especially after moistening by dew or rain.

So also the insecticide composition can be produced in paste form, for example, in the form of a 50% paste of lead arsenate, by intimately mixing and incorporating the gum arabic with the filter cake containing the proper amount of water. A corresponding amount of gum arabic can be used for this purpose, i. e., about 1% of the weight of the lead arsenate. The incorporation of the gum arabic, and the production of the paste, can be effected in any suitable apparatus, as in an appropriate kneading or mixing machine.

The employment of lead arsenate produced in the manner above described and as more fully set forth in our Patent No. 1,344,035, has the advantage that the lead arsenate is free from electrolytes such as nitric acid or soluble lead salts, which, if present in objectionable amount, might interfere with the production of suspensions of the desired composition in the desired state of dispersion or deflocculation. Any suitable form of lead arsenate can, however, be similarly employed in the production of the novel composition of the present invention, provided it does not contain impurities or admixtures which interfere with the desired action of the deflocculating agents. Commercial lead arsenate deficient in suspension and adhesive power can thus be converted into a composition with immensely improved suspension and adhesive power. Nevertheless, as above pointed out, we consider lead arsenate produced as above described, and free from electrolytes, as particularly advantageous for use in the novel composition of the present invention.

When the insecticide composition of the present invention is added to water, it can be readily suspended therein and maintained in suspension for considerable periods of time. The gum arabic or other deflocculating agent serves to maintain the particles of lead arsenate in a dispersed or deflocculated state so that the particles or crystals do not tend to aggregate or flocculate together even when the composition is sprayed upon the surfaces. As a result of this dispersed or deflocculated condition, the composition has the improved spreading, covering and adhesive qualities above referred to, and, when examined under the microscope, shows the particles in a dispersed state, distributed with substantial uniformity; whereas, insecticides heretofore known, in as far as we have investigated them, show the particles aggregated together in the form of groups when examined under the microscope. It is due to this dispersed or deflocculated condition, as we believe, that the composition can be applied with uniformity, for example, to foliage, so that it will be uniformly spread out over the leaves and so that different parts of the leaf will be provided with their proportionate particle or particles of the insecticide.

A comparison of the novel composition of the present invention with insecticides previously known shows that the compositions of the present invention have markedly superior adhesive qualities. It has thus been found that when the composition is uniformly distributed over a leaf, it is not readily washed off, whereas with insecticides previously known the insecticide is not only unevenly distributed over the leaf, but is more easily washed off, even by rain. The insecticide compositions of the present invention accordingly retain their effectiveness over longer periods of time, and particularly after periods of rain which will remove to a serious degree lead arsenate insecticides heretofore known. These advantages of the present invention are cumulative, in that the insecticides of the present invention provide increased protection to vegetation, due to their even distribution and to the freedom from aggregation and uncovered spaces bearing no insecticides, and to the prolonged life or period of usefulness during which the insecticides remain affixed to the foliage.

The improved insecticides of the present invention can be distinguished from the lead arsenate used in their production (which is free from any admixture with a deflocculating agent), and from all lead arsenates heretofore known, in so far as we are aware, by the following comparative test. Two grams of the new insecticide composition and two grams of the old lead arsenate, respectively, are suspended in 100 cc. of water and immediately, after thorough agitation, applied to clean glass plates to form a continuous layer thereon. After standing one minute the excess is shaken off and the plates dried. There will then be a substantially continuous and even coating of the new composition, while the old arsenate will present an uneven and discontinuous coating. The plates are then similarly held in rapidly running water for half a minute and then dried. There will still be a substantially continuous and even coating of the new composition, substantially the same in appearance as before, while a large amount of the old lead arsenate will be washed off, and that remaining will present a pronounced unevenness and lack of continuity. Even when submitted to a violent stream of water it has been found that a nearly continuous coating of the new composition remains.

When the layer of the suspension of the new composition is spread on the glass plate, as above described, it runs evenly over the glass and presents a uniform milky appearance, whereas the suspension of the old lead arsenate, when similarly spread over a glass plate, shows a pronounced tendency of the particles to aggregate and to distribute themselves unevenly.

The radically improved suspension properties of the new composition will be apparent from the following tables, giving the results of comparative suspension tests made with dry lead arsenates and with the same lead arsenates compounded with 1.25% of gum arabic, mixed on a dry basis. The lead arsenate marked No. 1 was produced in accordance with the process of our Patent No. 1,344,035, as above described. The lead arsenates marked Nos. 2 to 5 were commercial forms of lead arsenate upon the market. These tests were made by suspending 6 grams of the dry lead arsenate, or of the composition of lead arsenate and gum arabic, at ordinary temperatures, in 250 cc. of water in a cylinder of about 1½ inches diameter, having a graduated scale on its side, ranging from 250 cc. at the top to 0 cc. at the bottom. The suspensions were shaken at the same time and observations made at the ends of the periods indicated, as shown in the tables.

The figures given in Table I are the lines of separation of the suspension and the clear water above, that is, the extent to which the suspension has settled from the 250 cc. mark at the ends of the respective periods of time.

TABLE No. I.—*Lead arsenate without gum arabic.*

| Time. | No. 1. | No. 2. | No. 3. | No. 4. | No. 5. |
|---|---|---|---|---|---|
| | Cc. | Cc. | Cc. | Cc. | Cc. |
| 1 minute | 190 | 130 | 195 | 190 | 175 |
| 3 minutes | 110 | 46 | 110 | 75 | 90 |
| 5 minutes | 64 | 33 | 72 | 40 | 55 |
| 10 minutes | 39 | 28 | 44 | 30 | 37 |
| 15 minutes | 36 | 26 | 41 | 27 | 33 |
| 20 minutes | 33 | 24 | 38 | 25 | 31 |
| 30 minutes | 30 | 23 | 35 | 24 | 28 |
| 1 hour | 27 | 22 | 33 | 24 | 27 |
| 2 hours | 26 | 22 | 33 | 23 | 27 |
| 3 hours | 26 | 22 | 33 | 23 | 27 |
| 4 hours | 25 | 21 | 31 | 23 | 27 |
| 19 hours | 25 | 21 | 31 | 23 | 27 |
| 24 hours | 25 | 21 | 31 | 23 | 27 |

In Table No. II there are two notations. The figures preceded by the word "Bulk" indicate the volume, at the bottom of the cylinder, of the heavier solid particles, which settled out and were more or less clearly defined from the still milky liquid above containing the finer particles. The figures preceded by the words "Clear to" indicate the extent to which the finely divided or deflocculated material settled out leaving a clear liquid above.

TABLE No. II.—*Lead arsenate with gum arabic.*

| Time. | | No. 1. | No. 2. | No. 3. | No. 4. | No. 5. |
|---|---|---|---|---|---|---|
| 1 minute | | | 250 cc. | 250 cc. | 250 cc. | 250 cc. | 250 cc. |
| 3 minutes | | | 250 | 250 | 250 | 250 | 250 |
| 5 minutes | Bulk | | 4 cc. | 8 cc. | 23 cc. | 13 cc. | 6 cc. |
| 10 minutes | Bulk | | 4 | 9 | 24 | 14 | 7 |
| 15 minutes | Bulk | | 5 | 10 | 22 | 14 | 7 |
| 20 minutes | Bulk | | 5 | 10 | 21 | 14 | 8 |
| | Clear to | | | | | 249 | 249 |
| 30 minutes | Bulk | | 5 | 11 | 20 | 14 | 9 |
| | Clear to | | | | 249 | | 249 |
| 1 hour | Bulk | | 6 | 12 | 19 | 16 | 11 |
| | Clear to | | 249 | 249 | 246 | 249 | 245 |
| 2 hours | Bulk | | 6 | 14 | 19 | 16 | 12 |
| | Clear to | | 248 | 249 | 245 | 247 | 244 |
| 3 hours | Bulk | | 6 | 14 | 19 | 16 | 14 |
| | Clear to | | 246 | 248 | 243 | 245 | 238 |
| 4 hours | Bulk | | 6 | 14 | 20 | 17 | 14 |
| | Clear to | | 244 | 248 | 239 | 243 | 235 |
| 19 hours | Bulk | | 6 | 15 | 20 | 17 | 15 |
| | Clear to | | 220 | 240 | 206 | 222 | 200 |
| 24 hours | Bulk | | 6 | 15 | 20 | 17 | 15 |
| | Clear to | | 215 | 238 | 200 | 214 | 186 |

The improvement in suspension properties indicated by Table No. II, as compared with Table No. I, is characteristic of the present invention. It will be noted that while the different products of each table differ somewhat in their suspension properties, yet there is a radical difference between the suspension properties of the compositions of Table No. II, and the suspension properties of the lead arsenates of Table No. I. The lead arsenates of Table No. I settle comparatively rapidly. The compositions of Table No. II remain in suspension for prolonged periods of time, and the heavier particles, which settle out in a more or less distinct layer, nevertheless settle out much more slowly and in much less amount than do the lead arsenates of Table No. I. Even after several hours' time there still remain very considerable proportions of the compositions in suspension in the form of a milky suspension with no sharp line of demarcation from the clear water above.

Moreover, from a comparison of the different compositions of Table No. II, it will be seen that the composition indicated by No. I has markedly superior suspension properties to those of the other compositions, and retains nearly all in suspension without the settling out of any considerable amount of heavier particles, while the amount so settled out does not materially increase after the first ten minutes. This composition, accordingly, can be used to advantage even without agitation of the composition in the spray tank, during its use as a spray.

The insecticides of the present invention may contain compounded or incorporated therewith, other insecticide ingredients, for example, lime-sulphur insecticides and fungicides, such as are commonly employed in the art, provided these added ingredients do not destroy or prejudice the desired deflocculating action of the deflocculating agent or agents and the resulting deflocculated or dispersed condition of the composition. Lime-sulphur insecticides and fungicides may thus be compounded with the compositions above described to produce a dry pulverulent composition, or they may be admixed with the lead arsenate insecticide at the time the spray solution or suspension is prepared. The lime-sulphur products may thus, for example, be prepared in accordance with the procedure set forth in the Patent No. 1,336,957, granted April 13, 1920.

When lead arsenate is used with lime-sulphur solution, for example, in a ratio of 50 gallons of water, one and a quarter gallons of 32° Baumé lime-sulphur solution and one pound of lead arsenate powder, two important disadvantages are commonly encountered. Ordinary lead arsenate tends to decompose lime-sulphur solution rapidly with the formation of black lead sulphide and possibly lead sulpho-arsenate. At the same time, the suspension properties of the lead arsenate are largely destroyed. The new lead arsenate compositions of the present invention, being largely free from electrolytes and containing a colloidal deflocculating agent, such as gum arabic, has much less tendency to react with lime-sulphur with the resulting formation of lead sulphide and the removal of active calcium polysulphides. This characteristic difference is clearly shown by noting the relative rates at which darkening occurs when ordinary lead arsenate, compounded with lime-sulphur, is compared with the new lead arsenate composition similarly treated. It should be understood that darkening will invariably occur to a greater or less extent in every case, but this tendency will be much less marked with the new compositions of the present invention. Under the above conditions the improved suspension power of the new lead arsenate and its adhesive qualities, after drying, are retained.

We claim:

1. An insecticide composition comprising lead arsenate and an emulsoid colloid, said composition, when used in admixture with lime-sulfur as a spray, being readily suspendable in water, and the resulting spray, after drying, forming an adherent film resistant to the erosive action of water.

2. An insecticide composition comprising lead arsenate having a relatively small proportion of gum arabic incorporated therewith and adapted when said composition is deposited from a liquid suspension upon a surface to provide a substantially continuous and adhering coating of said composition upon said surface.

3. An insecticide composition comprising lead arsenate substantially free from electrolytes and having a relatively small proportion of gum arabic incorporated therewith, said composition being adapted, when deposited from a liquid suspension upon a surface, to provide a substantially continuous and adhering coating upon said surface.

4. An insecticide composition comprising lead arsenate, a relatively small proportion of gum arabic, and lime-sulfur constituents, said composition having superior suspension qualities and forming, when used as a spray, an adherent dry film resistant to the erosive action of water.

In testimony whereof we hereunto affix our signatures.

OSCAR F. HEDENBURG.
DAVID S. PRATT.